United States Patent

Masaki et al.

[11] Patent Number: 4,591,240
[45] Date of Patent: May 27, 1986

[54] LIQUID CRYSTAL DISPLAY ELEMENT HAVING COLORED RESIN MASKING LAYER

[75] Inventors: Yuichi Masaki, Kawasaki; Yoshio Hotta, Atsugi, both of Japan

[73] Assignee: Canon Kabushiki Kaisha, Tokyo, Japan

[21] Appl. No.: 508,592

[22] Filed: Jun. 28, 1983

[30] Foreign Application Priority Data

Jul. 7, 1982 [JP] Japan .................................. 57-119061

[51] Int. Cl.[4] ................................................. G02F 1/13
[52] U.S. Cl. ............................ 350/339 R; 350/339 F
[58] Field of Search .................... 350/339 R, 341, 344

[56] References Cited

U.S. PATENT DOCUMENTS 3,966,305  6/1976  Young .................................. 350/341

FOREIGN PATENT DOCUMENTS 2912467  10/1980  Fed. Rep. of Germany ...... 350/341
1336254  11/1973  United Kingdom ................ 350/344

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

A liquid crystal element comprising a liquid crystal between a pair of electrode-supporting plates, wherein at least one of the electrode-supporting plates is provided with a light-intercepting mask which is formed from a water-soluble resin and colored, on the area other than the pattern electrode area.

7 Claims, 3 Drawing Figures

LIQUID CRYSTAL DISPLAY ELEMENT HAVING COLORED RESIN MASKING LAYER

BACKGROUND OF THE INVENTION

1. Field of the Invention

This invention relates to a liquid crystal element and, more particularly, to a liquid crystal display element used in a data recording device for photographically recording some data on film and to an image formation process for the data recording by use of the element.

2. Description of the Prior Art

A data recording device for a camera has so far been known which records some data such as date on a color or monochromatic film by protecting light from a lamp or some other light source on numerals, characters or marks for indicating data displayed in a liquid crystal display element and exposing the film to the transmitted light.

Such a data recording device employs, for example, a twisted nematic (TN) type of liquid crystal element as disclosed by W. Helfrich and M. Schadt in Canadian Pat. No. 1010136. This type of liquid crystal element has a nematic liquid crystal with positive dielectric anisotropy disposed between a pair of electrode-supporting plates, the nematic liquid crystal having a helical structure in which its molecular orientation is twisted continuously by 90 degrees from one plate toward the other plate. A pair of polarizing plates in the form of a parallel nicol are attached separately to both sides of the liquid crystal element. When the operational voltage is applied, the portions of the liquid crystal in the voltage-applied regions become light-transmitting state while the other portions (the non-electrode regions and the non-voltage applied regions) are in the light-intercepting state. However, in practical operation, the portions to be shielded from light transmit a little light, which acts undesirably on a color film or monochromatic film. Thus, a vague and illegible print of data is formed on photographic paper printed by using this color or monochromatic film.

For the purpose of eliminating this defect, the following method of preventing the undesirable transmission or leakage of light has hitherto been taken: The transmission of light is reduced by placing a light-intercepting mask of thin metallic film on the outside of the electrode plates and further incorporating a dichroic dye into the liquid crystal.

However, such a light-intercepting mask of thin metallic film is prepared by a complicated and high cost process, that is, by vapor deposition of a metal to entirely cover the electrode-supporting plate and etching to remove only the areas of the metallic film on the pattern electrodes according to the photo-lithographic process. In addition, this metallic light-intercepting film needs to be insulated from the pattern electrodes, and hence a gap is inevitably formed between the metallic light-intercepting film and the electrode pattern. As a result, undesirable leakage of light from the gap takes place. Furthermore, when the electrodes of the liquid crystal element are designed to operate in the dynamic driving mode, two or more common electrodes are necessary and must be insulated one from another, thus inevitably forming a gap between them and resulting in leakage of light through the gap.

SUMMARY OF THE INVENTION

An object of this invention is to provide a liquid crystal element comprising an inexpensive light-intercepting mask having sufficient light-intercepting property.

Another object of this invention is to provide a liquid crystal element suitable for a data recording device of a camera.

A further object of this invention is to provide a liquid crystal element comprising an aligning film having an excellent light-intercepting property.

Still another object of this invention is to provide a light-intercepting film suited as a light interceptor for a liquid crystal element employing electrodes for the dynamic driving mode.

According to the present invention, there is provided a liquid crystal element comprising a liquid crystal disposed between a pair of electrode-supporting plates, at least one of the pair of electrode-supporting plates being provided with a light-intercepting mask which is formed from a water-soluble resin and colored, on the area other than the pattern electrode area.

DETAILED DESCRIPTION OF THE INVENTION

Figure 1:
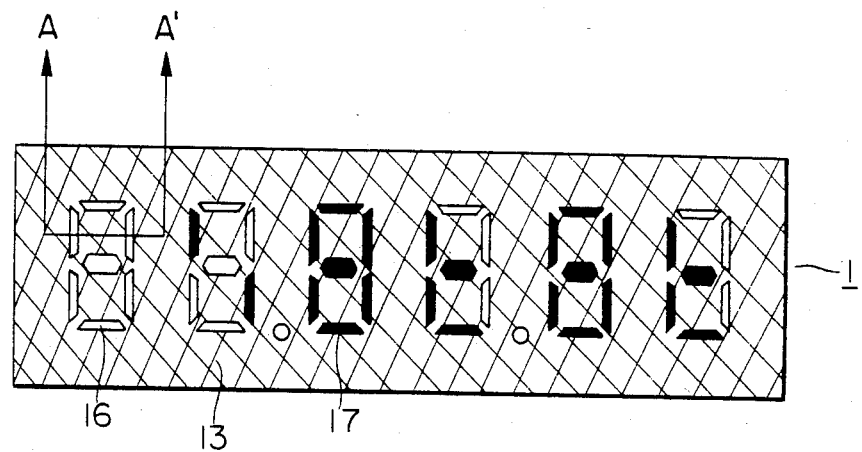
FIG. 1 is a plane view of the liquid crystal element of this invention.

The liquid crystal element of this invention is provided, on at least one of the pair of electrode-supporting plates constructing the liquid crystal element, with a light-intercepting mask which is formed from a water-soluble resin and colored by the dyeing treatment to shield the area other than the pattern electrode area of the electrode-supporting plate from the incident light.

Suitable water-soluble resins for use in preparation of the light-intercepting mask are polymers, for example, poly(vinyl alcohol), gelatin, casein and polyvinylpyrrolidone which are photosensitized to be curable with light. Photosensitizers usable for this purpose include, for example, ammonium dichromate and silver halides such as silver chloride, silver bromide, silver chlorobromide, silver chloroiodobromide and the like.

Referring now to the drawings, this invention is described in detail.

Figure 2:
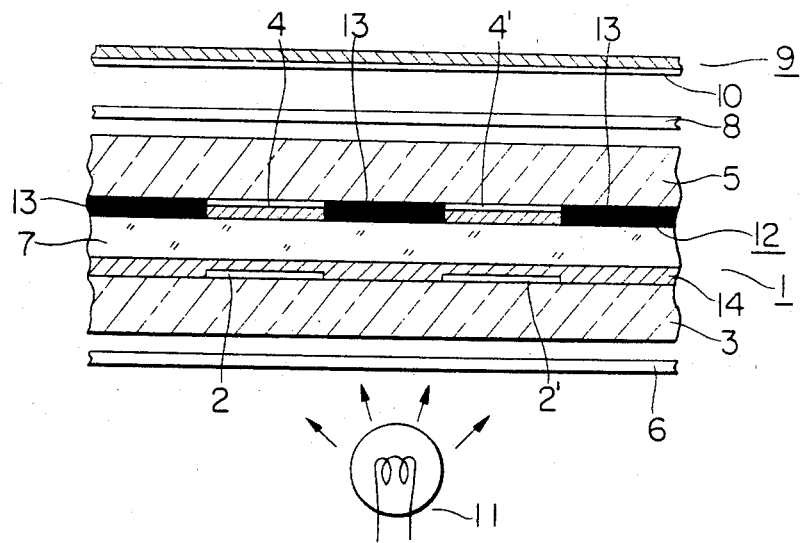
FIG. 2 is a cross-sectional view taken on line A—A' of FIG. 1.

FIGS. 1 and 2 show a plane view of a liquid crystal element of this invention used in a data recording device of a camera and a cross-sectional view taken on line A—A' of FIG. 1, respectively. A liquid crystal element 1 has a nematic liquid crystal disposed between a glass or plastic substrate 3 which supports display electrodes 2 and 2' and a glass or plastic substrate 5 which supports common electrodes 4 and 4'. The nematic liquid crystal has a positive dielectric anisotropy and has a helical structure, that is, its molecular orientation is twisted by 90 degrees from one substrate toward the other substrate. Suitable examples of the nematic liquid crystal used in this invention are phenylcyclohexane liquid crystals, phenylcyclohexane-ester liquid crystals, biphenylcyclohexane liquid crystals, and mixtures of cyanobiphenyl liquid crystals with terphenyl liquid crystals. These are available from Merck & Co., Inc. in Germany (tradenames: ZLI-1216, ZLI-1253, ZLI-1285, ZLI-1414, ZLI-1446, ZLI-1536, ZLI-1555). The helical structure of the nematic liquid crystal can be obtained by unidirectional rubbing of the surface of the substrates 3 and 5 with a cotton cloth, velvet, paper or the like, and arranging these substrates to cross the rubbing directions at right angles. Polarizing plates 6 and 8 are arranged on the outer sides of the substrates 3 and 5, respectively, to form parallel nicols. Light from a lamp 11 is polarized by passing it through the polarizing plate 6, and the polarization plane of the light is rotated by 90° in the twisted nematic liquid crystal layer 7. The optical-rotated, plane-polarized light is intercepted by the polarizing plate 8 (analyzer) since the polarization of the polarizing plate 8 is perpendicular to the vibration plane of the light wave passed through the liquid crystal layer 7.

When the operational voltage is applied, for instance, between the electrodes 2 and 4, molecular axes of the neumatic liquid crystal having a positive dielectric anisotropy in the region interposed between the electrodes 2 and 4 will align in the direction of the applied electric field, that is, the helical structure of the liquid crystal and hence the optical rotatory power thereof will disappear. Thus, the polarized light entering this section through the polarizing plate 6 does not undergo optical rotation and passes through the polarizing plate 8, which is "parallel" to the polarizing plate 6. The photosensitive emulsion layer 10 of a photographic film 9 is exposed to the light transmitted by the element, thereby forming a latent image.

The liquid crystal element of this invention is characterized in that a hardened resin layer 12 prepared from a water-soluble resin is laid on the substrate 5 having thereon the common electrodes 4 and 4' and its portion lying on the area where no electrode is formed is colored by dyeing to form a light-intercepting mask, for the purpose of intercepting securely the light cast on this area from the light source 11. Since this light-intercepting mask 13 is not electrically conductive, its insulation from the electrode 4 or 4' is unnecessary and no gap leaking light is therefore formed between the mask and any of the electrodes.

The hardened resin layer 12 is formed by exposing to light the whole surface of a coating film of gelatin, casein, poly(vinyl alcohol) or polyvinylpyrrolidone, photosensitized as stated above to harden it. The layer 12 is then subjected to an aligning treatment, e.g. unidirectional rubbing. In the same manner, a hardened resin layer 14 can be formed on the other substrate 3 and subjected to such an aligning treatment.

Figure 3:
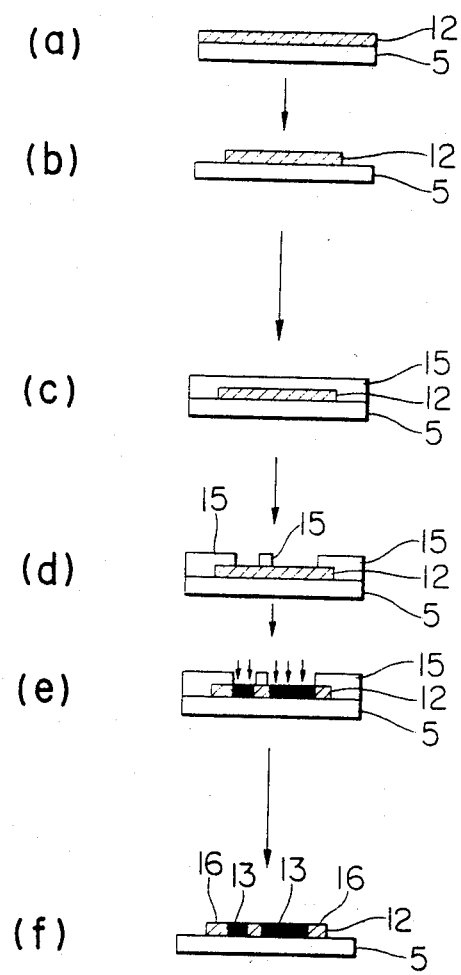
FIG. 3 is an illustration showing a process for preparing an electrode-supporting plate having a light-intercepting mask for use in the liquid crystal element of this invention.

The light-intercepting mask 13 can be prepared, for example, as shown in FIG. 3 by the following procedure:

The inner side of a glass substrate 5, on which pattern electrodes consisting of a thin transparent conductive film not shown are laid, is coated with, for example, poly(vinyl alcohol) (hereinafter, represented by PVA). The PVA used is e.g. Gosenol EG-05 (made by The Nippon Synethetic Chem. Ind. Co., Ltd.); its 10% aqueous solution, after addition of ammonium dichromate as a photosensitizer in an amount of 5% based on the solid PVA, is applied on the substrate 5 by spinner coating at 6000 r.p.m. for 10 seconds. The coating is then dried at 60° C. for 15 minutes [step (a) shown in FIG. 3]

For the purpose of etching peripheral area of the PVA film 12, such area is masked and then exposed to light for 10-15 minutes followed by developing pure water for 30 minutes to remove the unexposed peripheral area. After drying at 80° C. for 5 minutes in a stream of nitrogen [step (b)], the surface of the PVA film 12 is rubbed so as to exhibit a molecular aligning property.

A photoresist composition (FPPR No. 800 supplied by Fuji Yakuhin Kogyo K. K. ) is applied onto the whole surface of the substrate 5 including the surface of the PVA film 12 by spinner coating at 2000 r.p.m. for 10 seconds and is dried at 80° C. for 5 minutes to form a photoresist layer 15 [step (c)]. The photoresist layer 15, covered with a mask of the same pattern as the pattern electrodes, is exposed to light for 7 minutes, developed to remove its portions lying on the non-electrode areas, and rinsed with water to form a pattern of photoresist 15 covering the electrode areas [step (d)].

The resulting plate is then dipped in a dye solution for 5 minutes to dye the PVA film 12. The dyeing may be carried out by dipping the plate either in a solution of Sumifix Black ENS (Sumitomo Chem. Co., Ltd.), Solophenyl NGL (Ciba Geigy A. G.) or Cibacet Grey NH (Ciba Geigy A. G.) in a 2% aqueous solution of $NH_4OH$ or in two or three solutions of any of these dyes in series to give a required color density. Thus, of the PVA film 12, the section covering the non-electrode area of the substrate 5 is dyed [step (e)].

After rising of the plate with pure water, the remaining photoresist layer 15 is removed with methyl ethyl ketone. The plate is further rinsed with isopropanol, dried in a fluorocarbon (e.g. trifluoromethane or tetrafluoroethane) vapor and baked at 180° C. for 15 minutes. Through these finishing steps, the light-intercepting mask 13 is formed [step (f)], wherein the transparent sections 16 of the mask are formed on the pattern electrodes and the dyed nontransparent section of the mask is formed on the remaining area.

The substrate 5 having the common electrodes 4 and 4' and the light-intercepting mask 13 thus formed is combined with the substrate 3 having the display electrodes 2 and 2', and the polarizing plates 6 and 8 are arranged in the form of parallel nicol to complete a liquid crystal display element of this invention. When using this liquid crystal element, a small quantity of light transmitted, as stated above by those sections of the liquid crystal layer 7 to which no voltage is applied is almost entirely absorbed by the dyed section of the mask 13, thus preventing the light exposure of the area other than data mark to be recorded, of the photographic film. It is a matter of course that a similar light-intercepting mask formed on the substrate 3 has a similar effect. In this case, the mask can be formed in the same manner as described above the cover the area other than the area corresponding to the electrode pattern. Similar light-intercepting masks may also be formed on both the substrates 3 and 5.

In the liquid crystal element 1, the guest-host mode can be utilized, that is, a dichroic dye can be incorporated into the liquid crystal layer 7, for the purpose of more securely preventing the undesirable transmission of the incident light. The dichroic dye contained in the liquid crystal layer 7 is oriented in the same direction as that of the liquid crystal; for instance, when the operational voltage is applied to the electrodes 4 and 4', the dichroic dye follows the orientation taken by the liquid crystal, i.e., in the direction of the applied electric field, thereby transmitting the incident light from the light source 11. When the electrodes 4 and 4' are once brought into the "off state" (where no voltage is applied), the dichroic dye assumes the twisted orientation in conformity to the helical structure of the liquid crystal so that the incident light from the light source 11 is absorbed by the dichroic dye to thereby intercept the light in this region.

As shown in FIG. 1, when, for example, the date portions "82.7.7" in the display segments are brought into the light-transmitting state (light-transmitting portions 16) and the other portions corresponding to the remaining segments are left in the light-intercepting state (light-intercepting portions 17), the emulsion layer 10 of a color photographic film is exposed to the light transmitted by the light-transmitting portions 16 and a latent image of "82.7.7" is formed in the emulsion layer 10. The film 9, through development, bleach-fix treatment, water washing, and rising, forms a colored negative image of "82.7.7".

Typical examples of the dichroic dye used in the liquid crystal element of this invention are as follows:

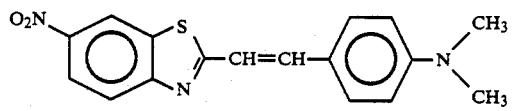

No. 1

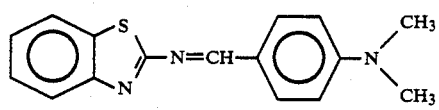

No. 2

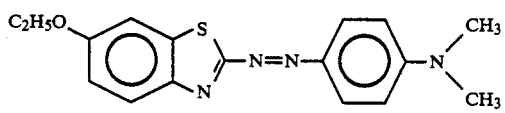

No. 3

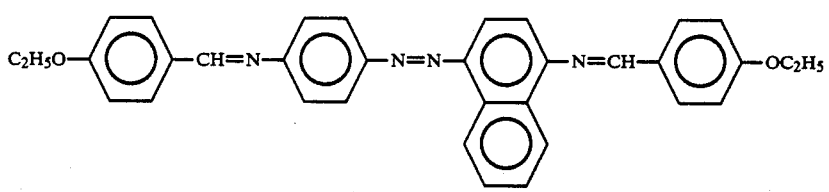

No. 4

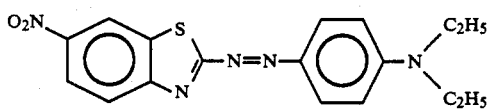

No. 5

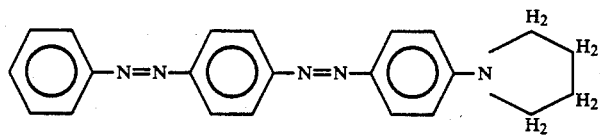

No. 6

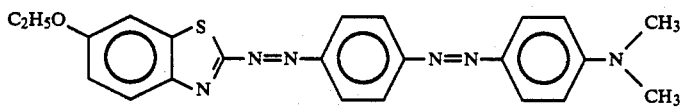

No. 7

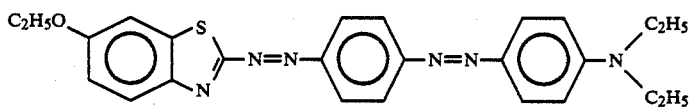

No. 8

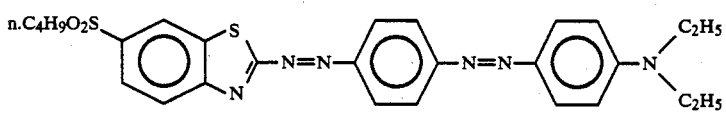

No. 9

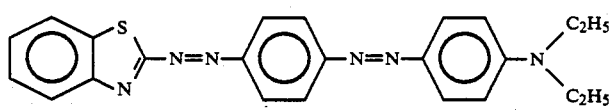

No. 10

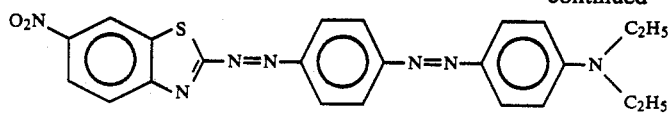
No. 11

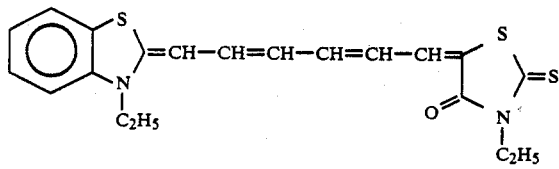
No. 12

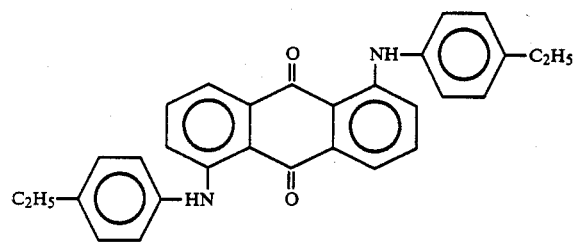
No. 13

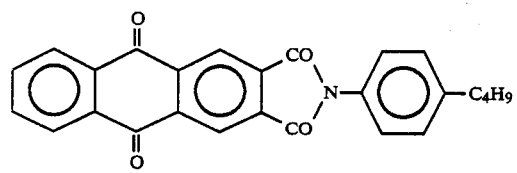
No. 14

The liquid crystal element of this invention is provided with a light-intercepting mask which is prepared from a clear, insulating, water-soluble resin film by dyeing the necessary sections thereof and serves also as a molecule aligning film. Accordingly, the present element is simple in structure and can prevent securely the undesirable transmission of the incident light in comparison to the liquid crystal element employing a metallic light-intercepting mask. In addition, the masking film used in this invention, because of its insulating property, can be arranged in contact with segment electrodes without causing any maloperation and can also be arranged in contact with common electrodes for the dynamic driving mode without short-circuiting them, thus accomplishing a desired dynamic driving mode display.

What we claim is:

1. A liquid crystal element comprising a liquid crystal cell between a pair of polarizing plates, said liquid crystal cell comprising a liquid crystal between a plate supporting two or more common electrodes and a plate supporting a segment electrode, wherein said plate supporting said two or more common electrodes is provided with a light-intercepting mask which is formed from a water-soluble resin and colored, and said mask is spaced between two or more common electrodes, and the plate supporting the segment electrode is provided with a light intercepting mask on the area other than the patterned segment electrode area.

2. A liquid crystal element according to claim 1, wherein said liquid crystal comprises a nematic liquid crystal having a positive dielectric anisotropy and being oriented in a helical structure.

3. A liquid crystal element according to claim 1, wherein said liquid crystal contains a dichroic dye.

4. A liquid crystal element according to claim 1, wherein said light-intercepting mask is a hardened film formed from poly(vinyl alcohol), polyvinylpyrrolidone, gelatin or casein.

5. A liquid crystal element according to claim 4, wherein said light-intercepting mask is a hardened film of poly(vinyl alcohol).

6. A liquid crystal element according to claim 1, wherein said light-intercepting mask is provided on the plate supporting a common electrode.

7. A liquid crystal element according to claim 1, wherein said pair of polarizing plates is arranged to form parallel nicols.

* * * * *